United States Patent
Mohan et al.

(10) Patent No.: US 10,708,144 B2
(45) Date of Patent: Jul. 7, 2020

(54) PREDICTING APPLICATION QUALITY OF EXPERIENCE METRICS USING ADAPTIVE MACHINE LEARNED PROBES

(71) Applicant: Juniper Networks, Inc., Sunnyvale, CA (US)

(72) Inventors: Hemachandran Karnam Mohan, Chittoor (IN); Abdul Kadhar Jeelany Habeeb Mohamed, Chennai (IN); Nithyananda Vishnu K S, Tamil Nadu (IN)

(73) Assignee: Juniper Networks, Inc., Sunnyvale, CA (US)

( * ) Notice: Subject to any disclaimer, the term of this patent is extended or adjusted under 35 U.S.C. 154(b) by 11 days.

(21) Appl. No.: 16/191,075

(22) Filed: Nov. 14, 2018

(65) Prior Publication Data

US 2020/0153701 A1 May 14, 2020

(51) Int. Cl.
*H04L 12/24* (2006.01)
*H04L 12/851* (2013.01)
*H04L 12/805* (2013.01)
*H04L 12/26* (2006.01)

(52) U.S. Cl.
CPC .......... *H04L 41/147* (2013.01); *H04L 41/16* (2013.01); *H04L 43/10* (2013.01); *H04L 47/2425* (2013.01); *H04L 47/365* (2013.01)

(58) Field of Classification Search
CPC ..... H04L 41/147; H04L 41/16; H04L 47/365; H04L 47/2425; H04L 43/10
See application file for complete search history.

(56) References Cited

U.S. PATENT DOCUMENTS

| 8,438,269 | B1 | 5/2013 | West, III |
| 9,544,240 | B1 * | 1/2017 | Przygienda ........... H04L 45/586 |
| 2015/0195212 | A1 * | 7/2015 | Vasseur ............... H04L 41/5025 370/252 |

(Continued)

FOREIGN PATENT DOCUMENTS

WO 2013/184846 A1 12/2013

OTHER PUBLICATIONS

"Application Quality of Experience (AppQoE)" TechLibrary, Juniper Networks, Inc., Sep. 27, 2018, available at https://www.juniper.net/documentation/en_US/junos/topics/topic-map/security-appqoe.html accessed Nov. 1, 2018, 23 pp.

(Continued)

*Primary Examiner* — Christopher P Grey
(74) *Attorney, Agent, or Firm* — Shumaker & Sieffert, P.A.

(57) ABSTRACT

In general, the disclosure describes techniques for evaluating application quality of experience metrics over a software-defined wide area network. For instance, a network device may receive an application data packet of a data flow. In response to receiving the application data packet, the network device determines whether a packet size of the application data packet is represented in a reference data store. In response to determining that the packet size is not represented in the reference data store, the network device predicts, based on the reference data store, flow metrics for the packet size for each of a plurality of Wide Area Network (WAN) links. The network device selects a WAN link on which to send the application data packet based on the predicted flow metrics.

20 Claims, 7 Drawing Sheets

(56) References Cited

U.S. PATENT DOCUMENTS

2015/0332155 A1* 11/2015 Mermoud .............. G06N 20/00
706/12
2016/0028608 A1* 1/2016 Dasgupta ................ H04L 43/16
370/252

OTHER PUBLICATIONS

Extended Search Report from counterpart European Application No. 19180805.4, dated Dec. 16, 2019, 9 pp.

* cited by examiner

PREDICTING APPLICATION QUALITY OF EXPERIENCE METRICS USING ADAPTIVE MACHINE LEARNED PROBES

TECHNICAL FIELD

The disclosure relates to computer networks.

BACKGROUND

Over the last few decades, the Internet has grown exponentially from a small network comprising of few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, the disclosure describes techniques for evaluating application quality of experience metrics over a software-defined wide area network in a manner that reduces the overall traffic sent over the various network links and thereby reduces the overhead of the links in the software-defined wide area network. In some Software-Defined Wide Area Networks (SD-WANs), the SD-WAN routing appliance may specify a path for data flows between client devices and application servers. These paths are typically selected using service-level agreement (SLA) parameters and various metrics of the WAN links. While the SLA parameters may be more static in nature, or at least predetermined prior to the SD-WAN appliance receiving the flow, the metrics of the various WAN links may be more dynamic, as the metrics describing the capabilities of the particular WAN link may vary based on various current aspects of the network. These metrics are obtained by sending probe packets on the various links and analyzing the results of the transmission, where probe packets having the same size as the data packets in the data flow reasonably measure how the particular WAN link could handle the data flow.

Instead of analyzing the data flows as they are received, analyzing the potential WAN links based on the received data flow, and then selecting the best WAN link for the particular data flow, the techniques described herein may pre-emptively and periodically send probe packets of various sizes to each of the potential WAN links in order to keep up-to-date records of the metrics for various WAN links such that the data flow may be routed swiftly upon receipt. For instance, when the techniques of this disclosure are enabled for a network device, the network device may maintain a reference data store to store performance metrics collected for probe packets of various data packet sizes that correspond to application data flows typically handled by the network appliance. These may be default sizes if a probing profile in the reference data store is not already specified or defined. Periodically, the network device may send multiple probe packets (e.g., one of each size specified in the reference data store) to each of the available WAN links in order to obtain current metrics for the specific WAN link if the WAN link was to transmit a data flow having the respective packet size, storing these metrics in the reference data store.

In some examples, the network device may receive an application data packet of a data flow. In response to receiving the application data packet, the network device determines whether a packet size of the application data packet is represented in the reference data store. In response to determining that the packet size is not represented in the reference data store, the network device predicts, based on at least a portion of the one or more metrics included in the reference data store, flow metrics for the packet size for each of a plurality of WAN links. The network device selects a WAN link of the plurality of WAN links on which to send the application data packet based on the predicted flow metrics. Further, for each of the plurality of WAN links, the network device sends a plurality of probe packets that includes a probe packet having the packet size to the respective WAN link to obtain an updated set of one or more metrics for the respective WAN link that includes metrics for the packet size and updates the reference data store to include the updated set of one or more metrics for each WAN link. Conversely, in response to determining that the packet size is represented in the reference data store, the network device determined a WAN link of the plurality of links on which to send the application data packet of the data flow based on a respective set of one or more metrics for each WAN link of the plurality of WAN links and sends the application data packet to the selected WAN link.

These techniques may also be extended within each WAN link. For instance, each WAN link may include multiple queues. In addition to sending the probe packets to each of the WAN links, the network device may send a set of probe packets from each queue within the WAN link to even more specifically determine a best route for the data flow on a per-queue basis.

There may be one or more advantages to using the techniques described herein. As one example, a predictive dynamic path selection (PDPS) engine may determine accurate service-level agreement (SLA) parameters through a predictive engine based on adaptive probes using real-time application parameters. Further, application probing in some implementations may be eliminated, reducing network traffic and the overall bandwidth consumed on each link and increasing the efficiency of processing the incoming data flows. When compared to other application probing techniques, the bandwidth consumed by the probe data may be reduced, and the available bandwidth may be used instead for customer data, improving the billing efficiency for the service providers. Link overhead may also be reduced, as sampled packets are not reconstructed with application quality of experience (APPQOE) custom headers and application packets are not sent over the link.

Further, because probe packets are sent over all WAN links as described herein, WAN link performance metrics are available for all WAN links, irrespective of where the application data traffic is flowing. Instances of switching applications to different WAN links may be reduced, as advanced policy-based routing (APBR) engine has access to proactive inputs of WAN link suitability based on the probe packets, and thereby the system may reduce or avoid frequent link switching. The PDPS engine may have steady/predictable probe bandwidth consumption on all links, which helps customers in capacity planning stages. Further, instead of reactively determining metrics for the various WAN links after analyzing the data flow, the techniques described herein may proactively determine measurements for data flows routinely handled by the network device, enabling the data flows to be routed more quickly upon arrival at the network device.

In one example of the techniques described herein, a method is described, the method including, in response to receiving, by a network device, an application data packet of a data flow, determining whether a packet size of the application data packet is represented in a reference data store. The reference data store includes data indicative of a plurality of probe packet sizes and a corresponding set of one or more metrics for each of a plurality of Wide Area Network (WAN) links. The method also includes, in response to determining that the packet size is not represented in the reference data store, predicting, by the network device and based on at least a portion of the one or more metrics included in the reference data store, flow metrics for the packet size for each of the plurality of WAN links. The method further includes selecting, by the network device and based on the predicted flow metrics, a WAN link of the plurality of WAN links on which to send the application data packet. Further, for each of the plurality of WAN links, the method includes sending, to the respective WAN link, a plurality of probe packets that includes a probe packet having the packet size to obtain an updated set of one or more metrics for the respective WAN link that includes metrics for the packet size and updating the reference data store to include the updated set of one or more flow metrics for the each of the plurality of probe packets for the respective WAN link.

In another example of the techniques described herein, a network device is described. The network device includes a memory configured to store a reference data store. The reference data store includes data indicative of a plurality of probe packet sizes and a corresponding set of one or more metrics for each of a plurality of Wide Area Network (WAN) links. The network device also includes one or more processors in communication with the memory. The one or more processors are configured to, in response to receiving an application data packet of a data flow, determine whether a packet size of the application data packet is represented in the reference data store. The one or more processors are also configured to, in response to determining that the packet size is not represented in the reference data store, predict, based on at least a portion of the one or more metrics included in the reference data store, flow metrics for the packet size for each of the plurality of WAN links. The one or more processors are further configured to select, based on the predicted flow metrics, a WAN link of the plurality of WAN links on which to send the application data packet. Further, for each of the plurality of WAN links, the one or more processors are configured to send, to the respective WAN link, a plurality of probe packets that includes a probe packet having the packet size to obtain an updated set of one or more metrics for the respective WAN link that includes metrics for the packet size and update the reference data store to include the updated set of one or more flow metrics for the each of the plurality of probe packets for the respective WAN link.

In another example of the techniques described herein, a non-transitory computer-readable storage medium is described, the non-transitory computer-readable storage medium storing instructions thereon that when executed cause one or more processors, via execution of a software-defined networking (SDN) device, to, in response to receiving an application data packet of a data flow, determine whether a packet size of the application data packet is represented in a reference data store. The reference data store includes data indicative of a plurality of probe packet sizes and a corresponding set of one or more metrics for each of a plurality of Wide Area Network (WAN) links. The instructions, when executed, also cause the one or more processors to, in response to determining that the packet size is not represented in the reference data store, predict, based on at least a portion of the one or more metrics included in the reference data store, flow metrics for the packet size for each of the plurality of WAN links. The instructions, when executed, further cause the one or more processors to select, based on the predicted flow metrics, a WAN link of the plurality of WAN links on which to send the application data packet. Further, for each of the plurality of WAN links, the instructions, when executed, cause the one or more processors to send, to the respective WAN link, a plurality of probe packets that includes a probe packet the packet size to obtain an updated set of one or more metrics for the respective WAN link that includes metrics for the packet size and update the reference data store to include the updated set of one or more flow metrics for the each of the plurality of probe packets for the respective WAN link.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
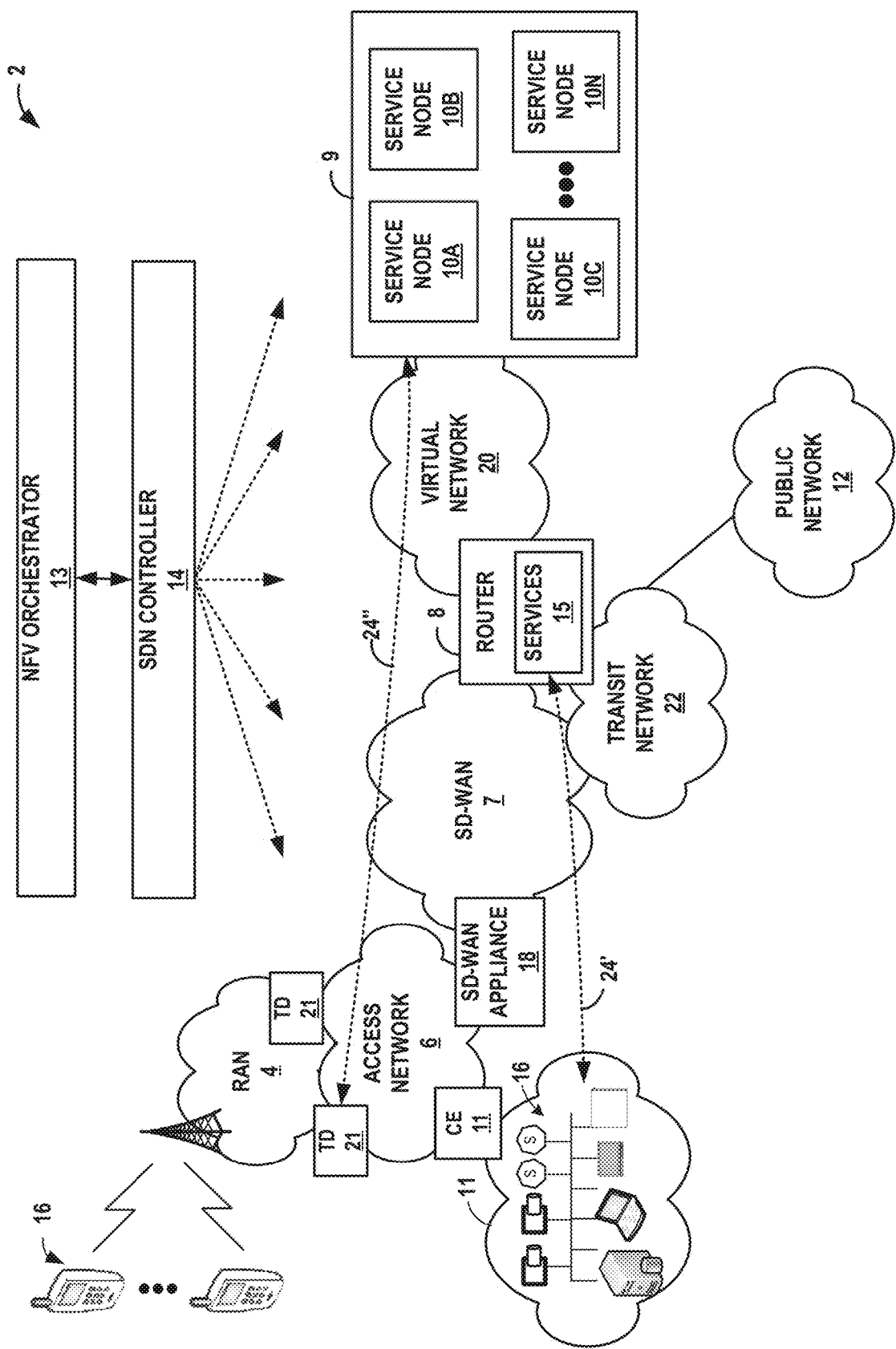
FIG. 1 is a block diagram illustrating an example software-define wide area network system that performs data monitoring using application quality of experience metric prediction functions, in accordance with the techniques of this disclosure.

FIG. 1 is a block diagram illustrating an example software-define wide area network system that performs data monitoring using application quality of experience metric prediction functions, in accordance with the examples described herein.

The example network system of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

In the example of FIG. 1, service provider network 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or router 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of service provider network 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, software-defined wide area network ("SD-WAN") appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 9. In addition, or alternatively, service provider network 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain.

Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliance 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, service provider network 2 comprises a software defined network (SDN) and network functions virtualization (NFV) architecture. SDN controller device 14 may provide a high-level controller for configuring and managing the routing and switching infrastructure of service provider network 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/US13/44378, filed Jun. 5, 2013, the entire content of which is incorporated herein by reference.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within network system 2, such as SD-WAN appliance 18, perform application data monitoring using various application quality of experience (QoE) metric functions, such as real-time performance monitoring (RPM) or two-way active measurement protocol (TWAMP), for example. That is, RPM and TWAMP may be used within service provider network 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions and exchange test packets for the data sessions. In the example network architecture illustrated in FIG. 1, SD-WAN appliance 18 is configured to perform the QoE metric predictions, as well as a dynamic path selection algorithm. SD-WAN appliance 18 allows for load sharing across connections and adjusts traffic flows based on network conditions to improve performance.

SD-WAN appliance 18, which performs the dynamic path selection algorithms, may determine QoE metrics, such as service level agreement (SLA) parameters that include round-trip time (RTT), jitter, and packet loss, which were influenced by applications' real-time parameters like packet size, queues and burst of packets to determine the best path. However, different applications have different packet sizes in their data flows. Furthermore, when a link in the network is transmitting a data flow received from services 15 and router 8, if active probe packets are transmitted over the same link to determine the SLA parameters, but the active probe packets have sizes that are different than the size of the data packets in the data flows being transmitted over the link, then inefficiencies can occur in the transmission of both the data flow and the probe packet that can lead to increased RTT, jitter, and packet loss. This can lead to incorrect measurements when determining whether the SLA metric requirements are satisfied.

To combat these inefficiencies, some network appliances may analyze the data flows as they are received to determine individual instances of the probe packets to immediately match the particular flow being received. However, this solution also creates various inefficiencies. If every flow must be analyzed at is received, followed by dynamically constructing probe packets before obtaining metrics from the WAN links, the network appliance must endure extraneous processing each time a data flow is received, and probe packets must be sent for every flow. This extraneous processing can reduce the overall efficiency of the entire system.

Instead of analyzing the data flows as they are received, analyzing the potential WAN links based on the received data flow, and then selecting the best WAN link for the particular data flow, the techniques described herein may periodically send probe packets of various sizes to each of the potential WAN links in order to keep up-to-date records of the metrics for various WAN links such that the data flow may be routed swiftly upon receipt. For instance, when the techniques of this disclosure are enabled for a network device, the network device may have a reference data store with indications of probe packets of various data packet sizes in data flows typically handled by the network appliance. These may be default sizes if a probing profile in the reference data store is not already specified or defined. Periodically, the network device may send multiple probe packets (e.g., one of each size specified in the reference data store) to each of the available WAN links in order to obtain current metrics for the specific WAN link if the WAN link was to transmit a data flow having the respective packet size, storing these metrics in the reference data store. As such, instead of reactively determining metrics for the various WAN links after analyzing the data flow, the techniques described herein may proactively determine measurements for data flows routinely handled by the network device, enabling the data flows to be routed more quickly upon arrival at the network device. Further, if probe packets of certain sizes are only sent to a portion of the WAN links, metrics for the remaining links may be unknown, hindering the network device's ability to route the application data packets effectively.

Using the techniques described herein, SD-WAN appliance 18 may dynamically predict flow metrics for unrepresented packet sizes for each of the WAN links based on active probe measurements and adjust the probe profile based on the current application data flow. Further, the active probe packets used in the custom profile are of constant size and sent to each of the potential WAN links, rather than varying the packet sizes between WAN links. Also, the techniques described herein may predict the flow metrics based on active probe measurements for packet sizes that are not represented in the initial probe profile. Moreover, SD-WAN appliance 18 dynamically updates characteristics (e.g., packet size and burst size) of the probe packets being sent on the WAN links using machine-learning techniques to conform the probe packets to characteristics of application data packets that are received by SD-WAN appliance 18, thereby adjusting the probe profile based on the current application data flow. For example, as described below, in accordance with the techniques described herein SD-WAN appliance 18 can implement a machine learning algorithm for determining packet sizes for the probe packets sent to the plurality of subscriber links in order to accurately measure the various QoE metrics and perform predictive dynamic path selection (PDPS).

In some examples, the data carried by QoE probe packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements (metrics) may include keepalive or path connectivity, round trip time (RTT), path delay, packet jitter, packet re-ordering, packet loss, service latency measurements, or service load measurements based on the received data.

For instance, in accordance with the techniques of this disclosure, SD-WAN appliance 18 may, in response to receiving an application data packet of a data flow, determine whether a packet size of the application data packet is represented in a reference data store (not shown). The reference data store may be stored by SD-WAN appliance 18, and may include data indicative of a plurality of probe packet sizes and a corresponding set of one or more metrics for each of a plurality of WAN links, e.g., links coupling SD-WAN appliance to devices in or accessible via service provider in SD-WAN 7. For instance, one of subscriber devices 16 may initiate a data flow that includes an application data packet with services 15 via SD-WAN appliance 18, and SD-WAN appliance 18 may process the data flow in accordance with the techniques described herein.

In response to determining that the packet size is not represented in the reference data store, SD-WAN appliance 18 may predict, based on at least a portion of the one or more metrics included in the reference data store, flow metrics for the packet size for each of the plurality of WAN links. SD-WAN appliance 18 may select, based on the predicted flow metrics, a WAN link of the plurality of WAN links on which to send the application data packet. Further, for each of the plurality of WAN links, SD-WAN appliance 18 may send a plurality of probe packets that includes a probe packet having the packet size to the respective WAN link to obtain an updated set of one or more metrics for the respective WAN link that includes metrics for the packet size and update the reference data store to include the updated set of one or more flow metrics for the each of the plurality of probe packets for the respective WAN link.

Figure 2:
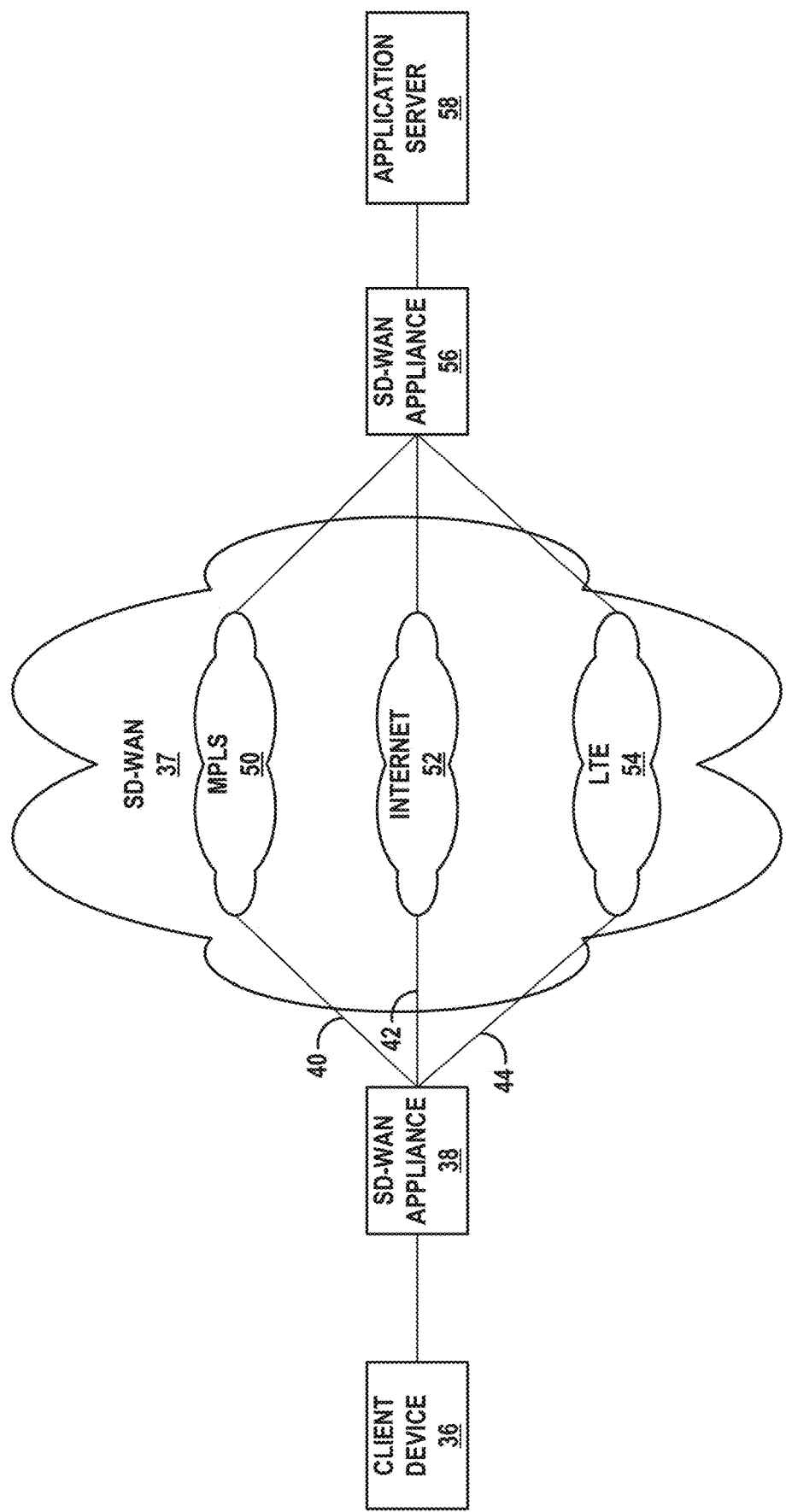
FIG. 2 is a block diagram illustrating an example software-defined wide area network, in accordance with one or more techniques of this disclosure.

FIG. 2 is a block diagram illustrating an example SD-WAN 37, in accordance with one or more techniques of this disclosure. In the example described herein, SD-WAN 7 includes three different WAN links: a first WAN link 40 coupling SD-WAN appliance 38 to a Multi-Protocol Layer Switching (MPLS) network 50, a second WAN link 42 coupling SD-WAN appliance 38 to Internet 52, and a third WAN link 44 coupling SD-WAN appliance 38 to long-term evolution (LTE) network 54. In other examples, SD-WAN 7 may include any number of links of any suitable type for transmitting data flows between the client side (e.g., client device 36 and SD-WAN appliance 38) and the application side (e.g., SD-WAN appliance 56 and application server 58).

The techniques described herein may include SD-WAN appliance 38 periodically sending probe packets of various sizes to each of the potential WAN links 40, 42, and 44 in order to keep up-to-date records of the metrics for WAN links 40, 42, and 44 such that the data flow may be routed swiftly upon receipt. For instance, when the techniques of this disclosure are enabled for SD-WAN appliance 38, SD-WAN appliance 38 may have a reference data store with indications of probe packets of various data packet sizes in data flows typically handled by SD-WAN appliance 38. These may be default sizes if a probing profile in the reference data store is not already specified or defined. Periodically, the network device may send multiple probe packets (e.g., one of each size specified in the reference data store) to each of the available WAN links 40, 42, and 44 in order to obtain current metrics for the specific WAN link if the WAN link was to transmit a data flow having the respective packet size, storing these metrics in the reference data store. As such, instead of reactively determining metrics for the various WAN links 40, 42, and 44 after analyzing the data flow, SD-WAN appliance 38 may proactively determine measurements for data flows routinely handled by SD-WAN appliance 38, enabling the data flows to be routed more quickly upon arrival at SD-WAN appliance 38 from client device 36.

For instance, in accordance with the techniques of this disclosure, SD-WAN appliance 38 may, in response to receiving an application data packet of a data flow, determine whether a packet size of the application data packet is represented in a reference data store (not shown). The reference data store may be stored by SD-WAN appliance 38, and may include data indicative of a plurality of probe packet sizes and a corresponding set of one or more metrics for each of a plurality of WAN links, e.g., links coupling SD-WAN appliance to devices in or accessible via service provider in SD-WAN 37. For instance, one of client devices 36 may initiate a data flow that includes an application data packet with associated with application server 58 via SD-WAN appliance 38, and SD-WAN appliance 38 may process the data flow in accordance with the techniques described herein.

In response to determining that the packet size is not represented in the reference data store, SD-WAN appliance 38 may predict, based on at least a portion of the one or more metrics included in the reference data store, flow metrics for the packet size for each of the plurality of WAN links 40, 42, and 44. SD-WAN appliance 38 may select, based on the predicted flow metrics, a WAN link of the plurality of WAN links 40, 42, and 44 on which to send the application data packet. Further, for each of the plurality of WAN links 40, 42, and 44, SD-WAN appliance 38 may send a plurality of probe packets that includes a probe packet having the packet size to the respective WAN link to obtain an updated set of one or more metrics for the respective WAN link that includes metrics for the packet size and the reference data store to include the updated set of one or more flow metrics for the each of the plurality of probe packets for the respective WAN links 40, 42, and 44.

In some instances, SD-WAN appliance 38 may perform these techniques for multiple queues in each of WAN links 40, 42, and 44. For instance, Internet link 42 may include eight different queues that are available to handle the data flow. Rather than generically send the plurality of probe packets to internet link 42, SD-WAN appliance 38 may send each of the plurality of probe packets to each of the plurality of queues within internet link 42 to obtain, in a more fine-grained sense, metrics for each of the queues in internet link 42. Throughout this disclosure, any technique performable on a per-link basis may also be performed on a per-queue basis within the respective link, including re-assigning data flows to other queues within the same link or re-assigning data flows from a queue in one link to a queue in a different link.

Figure 3:
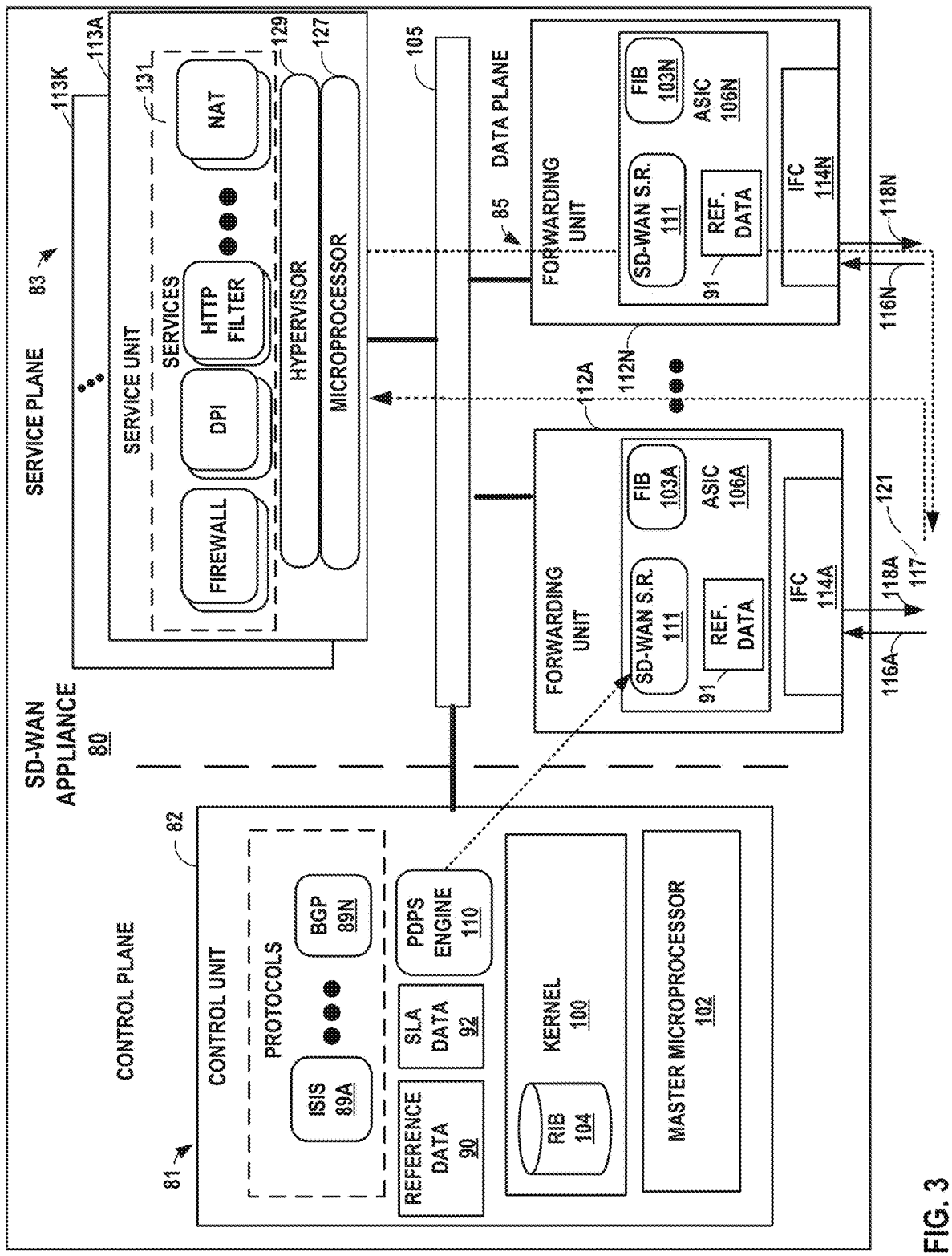
FIG. 3 is a block diagram illustrating an example software-defined wide area network appliance configured to execute one or more application quality of experience metric prediction functions using a predictive dynamic path selection (PDPS) engine, in accordance with the techniques of this disclosure.

FIG. 3 is a block diagram illustrating an example software-defined wide area network appliance 80 configured to execute one or more application quality of experience metric prediction functions using a PDPS engine 110, in accordance with the techniques of this disclosure. SD-WAN appliance 80 may be described herein within the context of service provider network 2 of FIG. 1, and may represent any of routers 8 or SD-WAN appliance 18, for example. Moreover, while described with respect to a particular network device, e.g., a router, the techniques may be implemented by any network device that may operate as a service endpoint, such as a client device, a Layer 3 (L3) or L2/L3 switch, or server.

In this example, SD-WAN appliance 80 is divided into three logical or physical "planes" to include a control plane 81 that performs control operations for the device, a data plane 85 for forwarding transit network traffic and a service plane 83 for application of one or more network services 87 to transit packet flows that are forwarded by the router. That is, router 81 implements three separate functionalities (e.g., the routing/control, forwarding data and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 83, and data plane 85 to deliver data units and control messages among the units. Switch fabric 105 may represent an internal switch fabric or cross-bar, bus, or link.

In the example of FIG. 3, control plane 81 includes control unit 82 having master microprocessor(s) 102, which executes device management services, subscriber authentication and control plane routing functionality of SD-WAN appliance 80. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein. Executables, such as PDPS engine 110 and services 131, may be operable by microprocessor 102 to perform various actions, operations, or functions of SD-WAN appliance 80. For example, microprocessor 102 of SD-WAN appliance 80 may retrieve and execute instructions stored by various data stores that cause microprocessor 102 to perform the operations of PDPS engine 110 and services 131.

One or more storage components (e.g., RIB 104) within SD-WAN appliance 80 may store information for processing during operation of SD-WAN appliance 80 (e.g., SD-WAN appliance 80 may store data accessed by PDPS engine 110 and services 131 during execution at SD-WAN appliance 80). In some examples, the storage component is a temporary memory, meaning that a primary purpose of the storage component is not long-term storage. Storage components on SD-WAN appliance 80 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components, in some examples, also include one or more computer-readable storage media. Storage components in some examples include one or more non-transitory computer-readable storage mediums. Storage components may be configured to store larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with PDPS engine 110 and services 131. Storage components 248 may include a memory configured to store data or other information associated with PDPS engine 110 and services 131.

In general, control unit 82 represents hardware or a combination of hardware and software of control that implements control plane protocols 89A-89N ("routing protocols 89") to learn and maintain routing information within routing information base 104 ("RIB 104"). RIB 104 may include information defining a topology of a network, such as service provider network of FIG. 1. Routing protocols 89 interact with kernel 100 (e.g., by way of API calls) executing on control unit 82 to update RIB 104 based on routing protocol messages received by SD-WAN appliance 80. Kernel 100 may resolve the topology defined by routing information in RIB 104 to select or determine one or more routes through the network. For example, the kernel may generate forwarding information in the form of forwarding information bases 103A-103N ("FIBs 103") based on the network topology represented in RIB 104, i.e., perform route resolution. Typically, kernel 100 generates FIBs 103 in the form of radix or other lookup trees to map packet information (e.g., header information having destination information and/or a label stack) to next hops and ultimately to interface ports of IFCs 114 associated with respective forwarding units 112. Each of FIBs 103 may associate, for example, network destinations with specific next hops and corresponding IFCs 114. For MPLS-related traffic forwarding, FIBs 103 stores, for a given FEC, label information that includes an incoming label, an outgoing label, and a next hop for a packet. Control unit 82 may then program forwarding units 112 of data plane 85 with FIBs 103, which installs the FIBs within lookup ASICs 106.

Data plane 85, in this example, is a decentralized data plane in that data plane functionality and packet forwarding functionality is distributed among a plurality of forwarding units 112A-112N ("forwarding units 112"). In the example of SD-WAN appliance 80, data plane 85 includes forwarding units 112 that provide high-speed forwarding of network traffic received by interface cards 114A-114N ("IFCs 44") via inbound links 116A-116N to outbound links 118A-118N. Forwarding units 112 may each comprise one or more packet forwarding engine ("PFE") coupled to respective interface cards 114 and may represent, for example, a dense port concentrator (DPC), modular port concentrator (MPC), flexible physical interface card (PIC) concentrator (FPC), or another line card, for example, that is insertable within a chassis or combination of chassis of SD-WAN appliance 80.

As shown in the example of FIG. 3, each of forwarding units 112 includes a respective one of lookup ASICs 106A-106N ("lookup ASICs 106") that receives control and data session traffic via IFC cards 114, performs route lookups and, based on routes installed to FIBs 103, forwards the traffic either to control unit 82 (control traffic destined for SD-WAN appliance 80) or to one of forwarding units 40 (transit data traffic) for output via an interface to one of output links 48. In one example, lookup ASICs 106 are microcode-controlled chipsets programmably configured by a slave microprocessor (not shown) executing on each of forwarding units 112. Specifically, in this example, each of ASICs 106 may be controllable by internal microcode programmed by a slave microprocessor.

When forwarding packets, control logic within each lookup ASICs 106 traverses the respective FIB 103 and, upon reaching a FIB entry for the packet (e.g., a leaf node), the microcode-implemented control logic automatically selects one or more forwarding next hops (FNHs) for forwarding the packet. In this way, ASICs 106 of forwarding units 112 process packets by performing a series of operations on each packet over respective internal packet forwarding paths as the packets traverse the internal architecture of SD-WAN appliance 80. Operations may be performed, for example, on each packet based on any of a corresponding ingress interface, an ingress PFE 114, an egress PFE 114, an egress interface or other components of SD-WAN appliance 80 to which the packet is directed prior to egress, such as one or more service cards. Forwarding units 112 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of forwarding units 112 arranges forwarding structures as next hop data that can be chained together as a series of "hops" along an internal packet forwarding path for the network device. In many instances, the forwarding structures perform lookup operations within internal memory of ASICs 106, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 106 determines the manner in which a packet is forwarded or otherwise processed by forwarding units 112 from its input interface on one of IFCs 114 to its output interface on one of IFCs 114.

Lookup ASICs 106 may be implemented using forwarding application specific integrated circuits (ASICs), field programmable gate arrays (FPGAs), or any other equivalent integrated or discrete logic circuitry, as well as any combinations of such components. Each of forwarding units 112 may include substantially similar components to perform substantially similar functionality.

Service plane 83 of SD-WAN appliance 80 includes a plurality of service units 113A-113K ("service units 13") that may be, as examples, removable service cards, which are configured to apply network services to packets flowing through data plane 85. That is, when forwarding packets, forwarding units 112 may steer packets to service plane 83 for application of one or more network services 131 by service units 113. In this example, each of service units 113 includes a microprocessor 127 configured to execute hypervisor 129 to provide an operating environment for a plurality of network services 131. As examples, service units 113 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of services 131 may be implemented, for example, as virtual machines or containers executed by hypervisor 129 and microprocessor 127.

In the example of FIG. 3, control unit 82 provides an operating environment for PDPS engine 110. In some examples, control unit 82 may use PDPS engine 110 to execute one or more TWAMP or RPM logical roles, such as a control client, a server, a sessions sender, and a session reflector.

PDPS engine 110 may be configured to perform the techniques described throughout this disclosure. For instance, PDPS engine 110 may be configured to send probe packets to links 118 to determine QoE metrics for the various links. PDPS engine 110 may also perform machine learning techniques to match the size of the probe packets to likely sizes of incoming/outgoing data packets in the data flows over links 118 and to perform predictive dynamic path selection for the respective data flows based on which WAN link of links 118 can best handle the respective data flow.

The example given below may include specific metrics or sizes for various aspects of the techniques of this disclosure. These specifics are merely one example of the potential values for the techniques described herein, and other values may be determined and utilized in the application of these techniques. The listed values are used only as an example and are not limiting.

Instead of analyzing the data flows as they are received, analyzing the potential WAN links based on the received data flow, and then selecting the best WAN link for the particular data flow, PDPS engine 110 may periodically send probe packets of various sizes to each of the potential WAN links in order to keep up-to-date records of the metrics for various WAN links such that the data flow may be routed swiftly upon receipt. For instance, when the techniques of this disclosure are enabled for PDPS engine 110, PDPS engine 110 may have reference data store 90 store probe packets of various data packet sizes in data flows typically handled by PDPS engine 110. Periodically, PDPS engine 110 may send multiple probe packets (e.g., one of each size specified in reference data store 90) to each of the available WAN links in order to obtain current metrics for the specific WAN link if the WAN link was to transmit a data flow having the respective packet size, storing these metrics in reference data store 90.

In accordance with the techniques described herein, PDPS engine 110 may, in response to receiving an application data packet of a data flow, determine whether a packet size of the application data packet is represented in a reference data store (e.g., reference data store 90). Reference data store 90 may include a plurality of probe packet sizes and a corresponding set of one or more metrics for each of a plurality of Wide Area Network (WAN) links.

For instance, in response receiving the data flow from a client device, an application server may send the data flow to SD-WAN appliance 18 and PDPS engine 110 for forwarding to the application server. The application server may be associated with any variety of applications, including social media applications, video streaming services, gaming applications, or any other application that may send and/or receive data packets to/from a client device using a data flow. In one example, PDPS engine may determine that the packet size of an application data packet in the data flow is 64 bits.

In some examples, PDPS engine 110 may determine that the packet size is represented in reference data store 90. For instance, PDPS engine 110 may query the reference data store 90 and determine that the packet size of 64 bits is already represented in the reference data store 90. This indicates that probe packets of size 64 bits have been previously sent to every WAN link in the system, and a set of metrics have been recorded for each of the WAN links for a 64-bit packet. This means that PDPS engine 110 may analyze those metrics to determine a WAN link on which to send the application data packet and the data flow, which will likely satisfy SLA requirements for the application. In so doing, PDPS engine 110 may also reference a data structure storing SLA requirements for applications (e.g., SLA data store 92). In an example, PDPS engine 110 may determine a WAN link of the plurality of WAN links on which to send the application data packet of the data flow based on the respective set of one or more metrics for each WAN link of the plurality of WAN links. For example, PDPS engine 110 may compare the metrics for the WAN links to SLA requirements for the identified application. PDPS engine 110 may then send the application data packet of the data flow to a client device via the WAN link of the plurality of WAN links.

In determining which WAN link of the plurality of WAN links on which to send the application data packet, PDPS engine 110 may compare the respective set of one or more metrics the packet size on each WAN link of the plurality of WAN links to a set of one or more service-level agreement parameters, e.g., stored in SLA data store 92. PDPS engine 110 may then select a WAN link from the plurality of WAN links that has respective metrics that most closely matches the set of one or more service-level agreement parameters as the WAN link on which to send the application data packet of the second data flow.

In other instances, the packet size of the application data packet may not correspond to any entries in the reference data store. For instance, PDPS engine 110 may not have received application data packets of size 64 bits previously, so PDPS engine 110 may not have analyzed the various WAN links for how each link could handle a data flow with packet sizes of 64 bits. As such, PDPS engine 110 may have to utilize other data points, such as metrics associated with packet sizes that are closest in size to 64 bits, to predict metrics for the data flow with packet sizes of 64 bits. PDPS engine 110 may process the data flow using these predicted metrics until PDPS engine 110 is able to create probe packets having a size equal to the packet size and obtain actual metrics for the WAN links.

For example, in response to determining that the packet size is not represented in the reference data store, PDPS engine 110 may predict, based on at least a portion of the one or more metrics included in the reference data store, flow metrics for the packet size for each of the plurality of WAN links. In some examples, the flow metrics, as well as the metrics in the reference data store, may include one or more of jitter, round-trip time, packet drop, and bandwidth.

In some instances, in predicting the flow metrics, PDPS engine 110 may predict the flow metrics using a machine learning model, such as a machine learning model that implements one or more of a logistic regression model, a linear discriminant analysis model, a K-Nearest neighbors model, a classification and regression trees model, a Gaussian naïve Bayes model, and a support vector machines model, for example. Predicting delay and jitter using linear regression is one example of the techniques described herein, though as noted there are other possible implementation mechanisms. For the linear regression algorithm, different buckets of prediction for each queue of all WAN Links may be kept. Based on the linear regression as described below, PDPS engine 110 may predict the SLA values for unknown packet sizes and then assess if there is any SLA violation by comparing to SLA requirements for the application associated with the data flow.

Simple linear regression is a type of regression analysis where the number of independent variables is one and there is a linear relationship between the independent(x) and dependent(y) variable. Based on the given data points, PDPS engine 110 may plot a line that models the points the best. The line can be modelled based on the linear equation shown below.

$$y = a\_0 + a\_1 * x \quad \#\#$$ Linear Equation

The motive of the linear regression algorithm is to find the best values for a_0 and a_1. While factors like cost function and gradient descent may affect optimizing the values for a_0 and a_1, an example of how to apply this to an example scenario assumes y is delay, and x is packet size, then the equation becomes, $$pkt\_delay = d\_0 + d\_1 * pkt\_size$$

Once the values for d_0 and d_1 are predicted, from the reference SLA data, PDPS engine 110 may derive packet delay (pkt_delay). Similarly, with jitter, $$pkt\_jitter = j\_0 + j\_1 * pkt\_size$$

A table of example packet measurements for multiple packet queues is shown below:

TABLE 1

| | | Example Packet Measurements | | | | | | | |
|---|---|---|---|---|---|---|---|---|---|
| | Pkt | Q0W0 | | Q0W1 | | Q0W2 | | Q0W3 | |
| | Size | Delay | Jitter | Delay | Jitter | Delay | Jitter | Delay | Jitter |
| | 64 | 127 | 42 | 98 | 46 | 144 | 46 | 123 | 44 |
| | 128 | 95 | 47 | 150 | 45 | 112 | 50 | 111 | 52 |
| | 256 | 120 | 40 | 106 | 42 | 138 | 43 | 122 | 47 |
| | 512 | 134 | 55 | 94 | 42 | 135 | 40 | 142 | 52 |
| Prediction | 370 | LR_d(370) | LR_J(370) | LR_d(370) | LR_J(370) | LR_d(370) | LR_J(370) | LR_d(370) | LR_J(370) |

If PDPS engine 110 determines that a packet size of 64 bits is not in the reference data store, PDPS engine 110 may use the above prediction techniques to predict flow metrics for a 64-bit application data packet. Further, for each of the plurality of WAN links, PDPS engine 110 may send a plurality of probe packets that includes a probe packet having the packet size to the respective WAN link to obtain an updated set of one or more metrics for the respective WAN link that includes metrics for the packet size and update the reference data store to include the updated set of one or more flow metrics for the each of the plurality of probe packets for the respective WAN link.

After the data flow is initially routed, PDPS engine 110 may obtain actual metrics for a 64-bit data flow on the various WAN links. PDPS engine 110 already has a plurality of probe packets of various unique sizes that it will send to each WAN link of the plurality of WAN links to obtain metrics for the various packet sizes. When PDPS engine 110 receives a data flow having a new size, PDPS engine 110 may include an additional probe packet in the plurality of probe packets that has a size equal to the new size, and send all of the probe packets (i.e., the new probe packet and each probe packet in the plurality of probe packets) to each of the WAN links in the plurality of WAN links to get an updated set of metrics for each WAN link that will include each of the previous packet sizes, as well as the new packet size.

In some instances, in sending the plurality of probe packets PDPS engine 110 may send a probe packet having the packet size to each of the plurality of WAN links to obtain respective metrics for the packet size. Further, for each of the probe packet sizes in the plurality of probe packet sizes, PDPS engine 110 may send a probe packet having the respective probe packet size to each of the plurality of WAN links to obtain the corresponding set of one or more metrics for the respective WAN link-probe packet size pair, with each probe packet size having a unique size that is also different than the packet size. PDPS engine 110 may store each set of one or more metrics and the respective metrics for the packet size in the reference data store as the updated set of one or more metrics.

After assigning the data flow to a WAN link, but while the data flow is still transmitting to the application server via the selected WAN link, PDPS engine 110 may monitor the status of the data flow. For instance, after assigning the 64-bit packet sized data flow to a particular WAN link, PDPS engine 110 may continue monitoring the processing of the data flow to ensure that the service-level agreement parameters for the data flow are met using the updated metrics obtained from sending the new group of probe packets to the WAN link. PDPS engine 110 may compare the updated set of one or more metrics for the WAN link to a set of one or more service-level agreement parameters stored in SLA data store 92. In response to determining that the set of one or more metrics for the WAN link satisfy the set of one or more service-level agreement parameters, PDPS engine 110 may maintain the data flow on the WAN link.

Conversely, in response to determining that the updated set of one or more metrics for the WAN link do not satisfy the set of one or more service-level agreement parameters, PDPS engine 110 may determine a second WAN link of the plurality of WAN links with a respective updated set of one or more metrics that satisfy the set of one or more service-level agreement parameters. PDPS engine 110 may then re-assign the data flow to the second WAN link of the plurality of WAN links.

In addition to packet sizes, PDPS engine 110 may also consider burst flows. For instance, PDPS engine 110 may determine a burst value for the data flow. In response to determining that the burst flow is not represented in the reference data store, PDPS engine 110 may predict, based on the reference data store, flow metrics for the burst flow for each of a plurality of WAN links. PDPS engine 110 may then update the probe profile based on the burst flow for the data packet and obtain one or more metrics for each of the plurality of WAN links using the updated probe profile. A burst flow, measured by burstiness, involves data packets sent intermittently in bursts rather than as a continuous stream.

The tables below show initial probe packet sizes and updated probe packet sizes after applying a machine learning model created from application traffic, in accordance with the techniques of this disclosure. Characteristics of probe packets, such as the packet size and burst packet sizes, for the probes are initially fixed to most common values. There can be an option to the network administrator to customize these values depending on the traffic pattern in their network. While the probes are sent in accordance with these pre-determined probing profiles initially, over a period, these will be fine-tuned based on machine learned values of the actual data flow on the links. Queue Values, pre-determined packet sizes are sent over all queues value initially; over a period, adjusted packet sizes and burst size are probed over all the queues.

TABLE 2

Example Initial Probe Sizes
Initial Probe Data

| Pkt Size | Queue | RTT | Jitter | Pkt Drop |
|---|---|---|---|---|
| 64 | Q0-Q5 | | | |
| 370 | Q0-Q5 | | | |
| 512 | Q0-Q5 | | | |
| 1024 | Q0-Q5 | | | |
| 1500 | Q0-Q5 | | | |
| Burst1 | Q0-Q5 | | | |

TABLE 3

Example Probe Sizes After Adjustments
Adjusted Probe Data

| Pkt Size | Queue | RTT | Jitter | Pkt Drop |
|---|---|---|---|---|
| 66 | Q0-Q5 | | | |
| 370 | Q0-Q5 | | | |
| 512 | Q0-Q5 | | | |
| 670 | Q0-Q5 | | | |
| 900 | Q0-Q5 | | | |
| 1400 | Q0-Q5 | | | |
| 6000 | Q0-Q5 | | | |
| Burst1 | Q0, Q3, Q4 | | | |
| Burst2 | Q0-Q5 | | | |

In this manner, the techniques of the disclosure enable PDPS engine 110 to have the necessary data to determine the link metrics at any given point in time with a degree of accuracy for any application. There are various algorithms available to determine the link metrics based on the reference data. While different algorithms may be used in different implementations to determine these metrics, some machine learning techniques which are suitable for learning probe packet size and burst size for PDPS include Logistic Regression, Linear Discriminant Analysis (LDA), K-Nearest Neighbors (KNN), Classification and Regression Trees (CART), Gaussian Naive Bayes (NB), Linear Regression, and Support Vector Machines (SVM).

These techniques may also be applied on a per-queue basis within each WAN link. For instance, each WAN link may include multiple queues for sending packets onto the WAN link. In addition to sending the probe packets to each of the WAN links, PDPS engine 110 may send a set of probe packets to each queue within the WAN link to even more specifically determine a best route for the data flow. As such, PDPS engine 110 may store indications of metrics for each queue within each WAN link, and assign the data flows to a specific queue within a particular WAN link based on There may be one or more advantages to using the techniques described herein. As one example, a predictive dynamic path selection (PDPS) engine may determine accurate service-level agreement (SLA) parameters through a predictive engine based on adaptive probes using real-time application parameters. Further, in some examples, passive application probing may be eliminated, reducing network traffic and the overall bandwidth consumed on each link and increasing the efficiency of processing the incoming data flows. In passive application probing, probe packets are installed on WAN links inline with the application data path and monitor the flow through those links. The probe packets are sampled data packets, encapsulated in an IP/UDP probe header and sent in with the live traffic between endpoints to monitor the flow metrics. When compared to other application probing techniques, such as passive probing, the bandwidth consumed by the probe data may be reduced through the use of the techniques described herein, and the available bandwidth may be used instead for customer data, improving the billing efficiency for the service providers. Link overhead may also be reduced, as sampled packets are not reconstructed with application quality of experience (APPQOE) custom headers and application packets are not sent over the link.

Further, because probe packets are sent over all WAN links as described herein, WAN link performance metrics are available for all WAN links, irrespective of where the application data traffic is flowing. Instances of switching applications to different WAN links may be reduced, as advanced policy-based routing (APBR) engine has access to proactive inputs of WAN link suitability based on the probe packets, and thereby the system may reduce or avoid frequent link switching. The PDPS engine may have steady/predictable probe bandwidth consumption on all links, which helps customers in capacity planning stages. Further, instead of reactively determining metrics for the various WAN links after analyzing the data flow, the techniques described herein may proactively determine measurements for data flows routinely handled by the network device, enabling the data flows to be routed more quickly upon arrival at the network device.

In one example of the proactive approach of the techniques described herein as opposed to the reactive approach, an SD-WAN appliance may handle upwards of 100 or more different data flows at any given time. Instead of SD-WAN having to craft 100 different probe packets that include sampled application packets, send the probe packets to each of the WAN links (or each queue within each WAN link), determine the metrics for each probe packet sent, and determine the optimal route for each data flow all between receiving the initial application data packet for the data flow and transmitting the data flow forward in the pipeline, according to the techniques described herein, the SD-WAN appliance 80 sends initial probe packets of a particular default probing profile, i.e., having default packet characteristics (e.g., packet size and burst size) that are representative of application data, without sending actual sampled application data packets, and over time the SD-WAN appliance 80 adjusts the characteristics of the representative probe packets to more closely match the actual application data that is flowing over the WAN links.

For application data flows that are not well-represented by the current probing profile, the SD-WAN appliance may predict which WAN link (or queue within a WAN link) is a good route for the respective flow based on the already known metrics, increasing the likelihood that a suitable WAN link is chosen for initial transmission to the application server. Metrics for the WAN links may then be determined after the flows have begun transmitting over the assigned links, the probing profile is updated, and the flows may be re-assigned to more suitable links or queues if the actual metrics for that route does not meet the SLA parameters.

Figure 4:
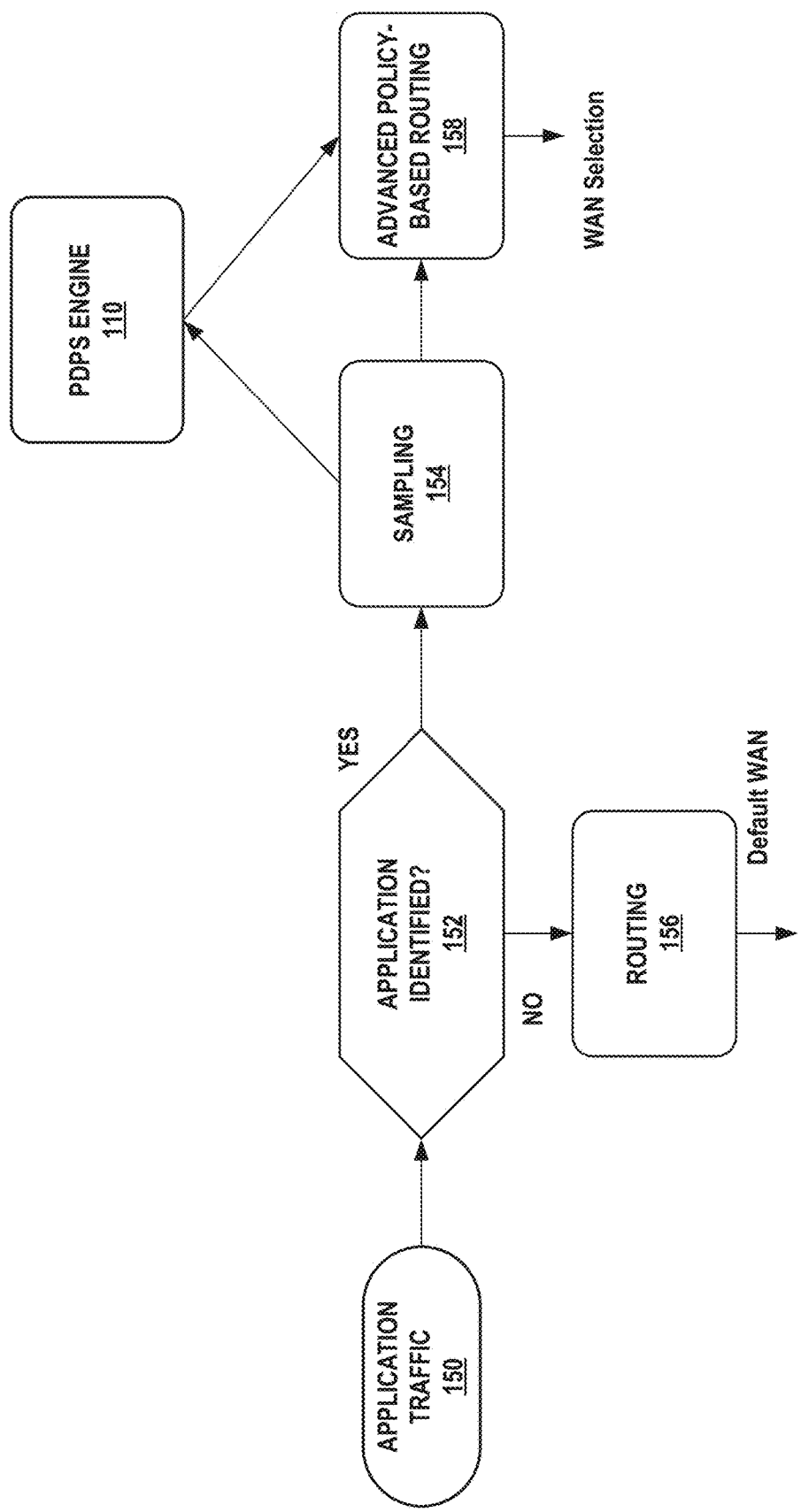
FIG. 4 is a conceptual flow diagram that includes an example PDPS engine configured to handle application traffic to predict application quality of experience metrics, in accordance with the techniques of this disclosure.

FIG. 4 is a conceptual flow diagram illustrating an example PDPS engine configured to handle application traffic to predict application quality of experience metrics, in accordance with the techniques of this disclosure. In accordance with the techniques described herein (e.g., PDPS), the active probes (e.g., conforming to the RPM/TWAMP protocols) with different packet sizes with all necessary queue values may be sent over all the WAN links to form the reference data 90. For burst traffic, packets with predetermined burst size can be probed. Then the sampled application data is matched with the reference data 90 to determine the SLA metric/violation on a WAN link, in fact, over all the available WAN links.

Executables, such as PDPS engine 110, sampling module 154, and advanced policy-based routing module 158, may be operable by a processor (e.g., microprocessor 102) to perform various actions, operations, or functions of a network device (e.g., SD-WAN appliance 80). For example, microprocessor 102 of SD-WAN appliance 80 may retrieve and execute instructions stored by various data stores that cause microprocessor 102 to perform the operations of PDPS engine 110, sampling module 154, and advanced policy-based routing module 158.

In the example of FIG. 4, an instance of the techniques described herein begin when application traffic enters the device (150), where the device is configured to perform the predictive dynamic path selection (PDPS) described herein. Control unit 82 may first send the packet to the service plane for application of one or more services 131, including Deep Packet Inspection (DPI) to identify an application associated with the packet. If DPI, did not identify the application ("NO" branch of 152), the application traffic follows the routing path indicated by RIB 104 (routing path 156) to the designated default WAN link, and session interest event is sent to a specific DPI engine for application identification.

Conversely, if the device identifies the application using DPI ("YES" branch of 152), the application traffic is handed over to a sampling application-based routing module (154) to determine a packet size of the application traffic. Although the exact packet size of the application traffic may affect which module within PDPS engine 110 continues the process, the sampling module 154 passes the sampled information to PDPS engine 110 so that PDPS engine 110 may select a preferred WAN link on which to send the application traffic. PDPS engine 110 sends this selection to an advanced policy-based routing module (158) to ensure that no additional restrictions apply to the application traffic and the selected WAN link before sending the application traffic to the requesting client device via the selected WAN link.

Figure 5:
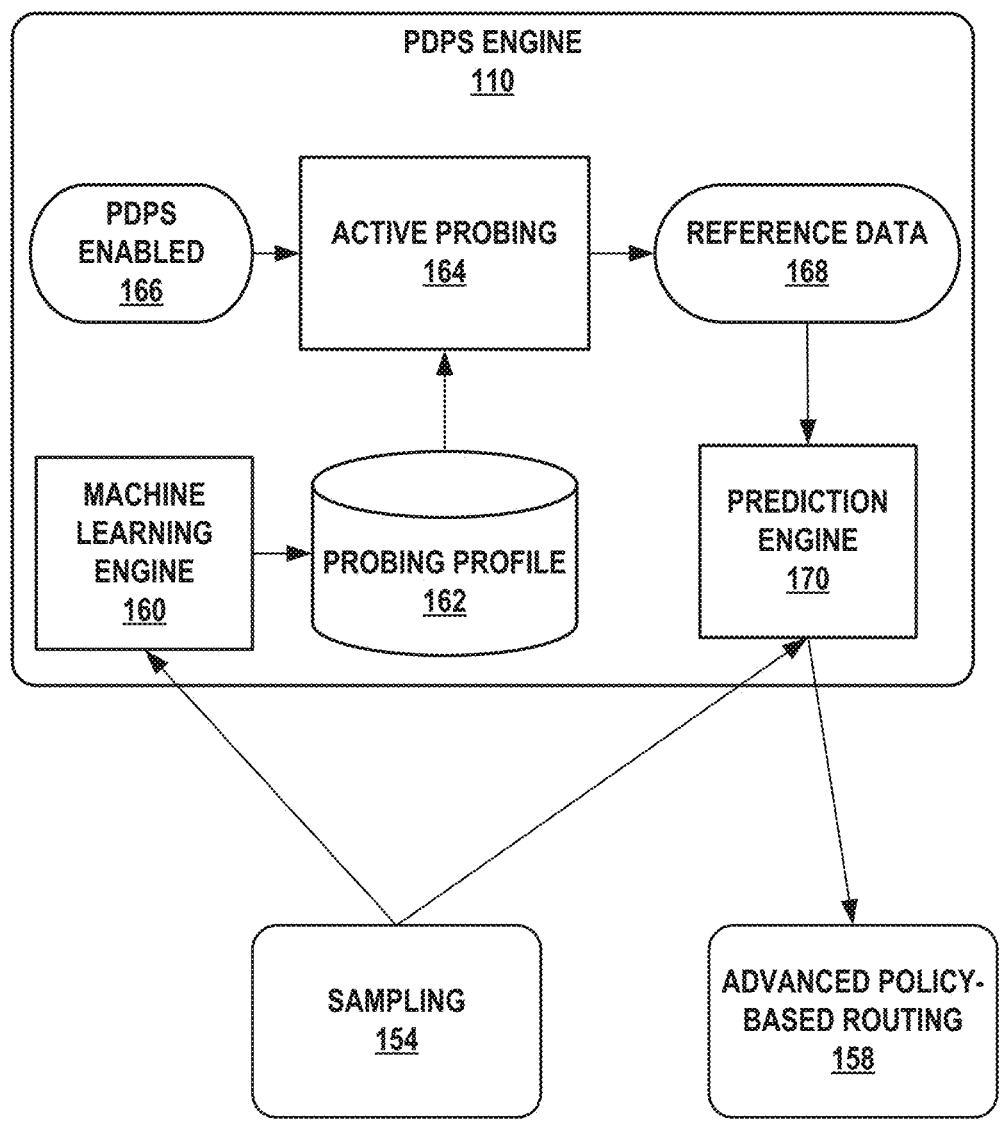
FIG. 5 is a conceptual diagram illustrating more detailed view of an example PDPS engine configured to handle application traffic to predict application quality of experience metrics, in accordance with the techniques of this disclosure.

FIG. 5 is a conceptual diagram illustrating more detailed view of PDPS engine 110 from FIG. 4, where PDPS engine 110 configured to handle application traffic to predict application quality of experience metrics, in accordance with the techniques of this disclosure. PDPS engine 110 may, in general, receive information or metadata regarding the application traffic to make an ultimate determination of how to route the application traffic. PDPS engine 110 may receive this information from sampling module 154 (as shown in FIG. 4).

Executables within PDPS engine, such as machine learning engine 160 and prediction engine 170, may be operable by a processor (e.g., microprocessor 102) to perform various actions, operations, or functions of a network device (e.g., SD-WAN appliance 80). For example, microprocessor 102 of SD-WAN appliance 80 may retrieve and execute instructions stored by various data stores that cause microprocessor 102 to perform the operations of machine learning engine 160 and prediction engine 170.

One or more storage components (e.g., probing profile 162, active probing process 164, and reference data store 168) within SD-WAN appliance 80 may store information for processing during operation of SD-WAN appliance 80 (e.g., SD-WAN appliance 80 may store data accessed by PDPS engine 110 and services 131 during execution at SD-WAN appliance 80). In some examples, predetermined active probing profile 162, dynamic active probing profile 164, and reference data store 168 are stored in temporary memory, meaning that a primary purpose of the storage component is not long-term storage. Storage components on SD-WAN appliance 80 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components, in some examples, also include one or more computer-readable storage media that store probing profile 162, active probing process 164, and reference data store 168. Storage components in some examples include one or more non-transitory computer-readable storage mediums. In some examples, predetermined active probing profile 162, active probing process 164, and reference data store 168 may be stored on media with larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with PDPS engine 110, machine learning engine 160, prediction engine 170, probing profile 162, active probing process 164, and reference data store 168. Storage components 248 may include a memory configured to store data or other information associated with PDPS engine 110, machine learning engine 160, prediction engine 170, probing profile 162, active probing process 164, and reference data store 168.

If sampling module 154 determines that there is no data in reference data store 168 that includes a PDPS configuration that matches the application traffic (e.g., the packet size of the application traffic does not match any of the reference data store 168), prediction engine 170 may receive the packet size information directly from sampling module 154. In such an instance, prediction engine 170 may predict, based on the current reference data store 168, what the flow metrics of the application traffic may be given the packet size. Prediction engine 170 may select a WAN link of the plurality of WAN links based on the predicted flow metrics in the reference data store. Prediction engine 170 may send an indication of the selected WAN link on which to send the application traffic to the advanced policy-based routing (APBR) module 158 (as shown in FIG. 4).

APBR is a type of session-based, application-aware routing mechanism. This mechanism combines a policy-based routing and application-aware traffic management solution. APBR involves classifying the flows based on attributes of various applications and applying filters based on these attributes to redirect the traffic. The flow-classifying mechanism is based on packets representing the application in use. For instance, if APBR module 158 performs DPI and determines that the data flow should be on a particular WAN link or a particular queue within the WAN link, APBR module 158 may override a previous decision made with regards to the WAN link and assign the data flow based on the rules used by APBR module 158.

If the sampling module 154 does find a match for the application traffic and the packet size, a sample of the application traffic sent by the sampling module 154 to PDPS engine 110. Machine learning engine 160 starts generating the active probes (which will be sent on all WAN links in active probing process 164) in accordance with the probe profile 162. PDPS engine 110 uses machine learning engine 160 to learn the packet sizes and burstiness from the sampled application data received from sampling module 154 in order to form the active probe profile. Predetermined active probe profile 162 includes predefined packet sizes and burst packets that will be sent over all of the WAN links during active probing process 164 as soon as the SDWAN PDPS configuration 166 is applied on the device.

PDPS engine 110 forms reference data 168 using the data attained through the active probes sent in accordance with active probing process 164. Probe profile 162, which is created by the machine learning engine, can be used in other operations, as per the customer needs. Probe profile 162 may refer to the data defining characteristics of probe packets to be sent across the plurality of WAN links. Once created, reference data 168 will include all of the necessary metrics for each of the plurality of WAN links.

The sampled application traffic is compared against the reference data and the closest match for the SLA values matching that traffic type is determined or predicted by the prediction engine 170. Based on the comparison of the application traffic and the reference data, the best path matching the SLA is selected by prediction engine 170 and the traffic is forwarded.

When the next packet of the application enters the node, sampling engine 154 again samples the application packet, and packet size and burst values are extracted for each WAN link from the current reference data 168. WAN Link metrics are derived for each WAN link for the given size of the application packet (based on the reference data 168) and validated with defined SLA. If the SLA requirements are met by the reference data for the existing WAN link, then PDPS engine 110 continues to forward the traffic on the existing WAN link. Conversely, if the SLA is violated, PDPS engine 110 forward the packet to next best WAN link based on the reference data.

In the techniques described herein, active probes with varied packet sizes (determined through machine learning) along with necessary burst size values (determined through machine learning) over necessary class of service (COS) queues to measure link metrics. Certain techniques described herein are shown below with respect to FIG. 6.

Figure 6:
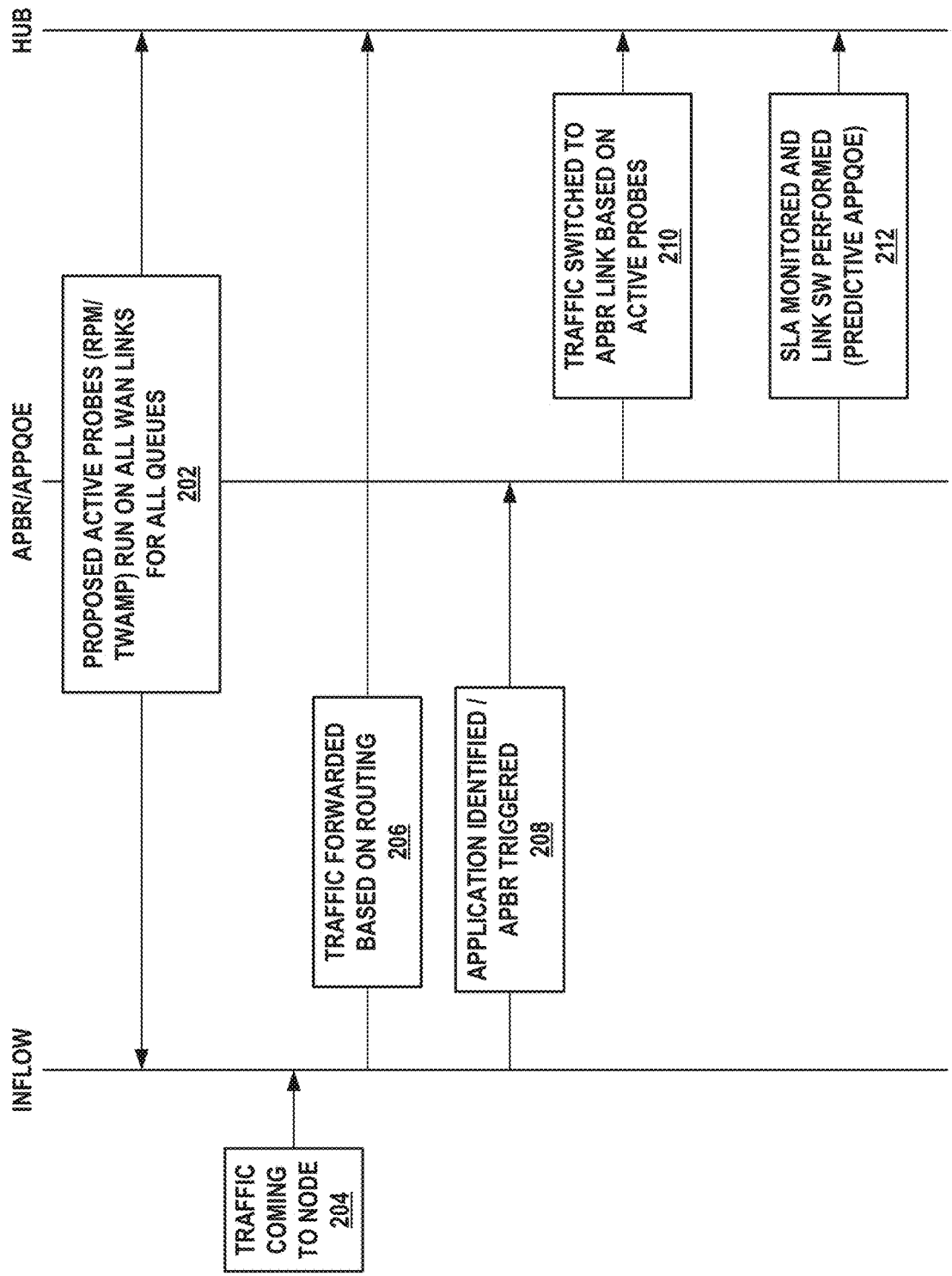
FIG. 6 is a flow diagram illustrating an example operation of predicting application quality of experience metrics over a software-defined wide area network using a machine learning model and variably-sized probe packets, in accordance with the techniques of this disclosure.

FIG. 6 is a flow diagram illustrating an example operation of predicting application quality of experience metrics over a software-defined wide area network using a machine learning model and variably-sized probe packets, in accordance with the techniques of this disclosure. The example operation may be performed by PDPS engine 110 executed on SD-WAN appliance 18 from FIG. 1. The following are steps of the process, although other examples of the process performed in the techniques of this disclosure may include additional steps or may not include some of the below-listed steps.

In the example of FIG. 6, PDPS engine 110 may send probe packets to all WAN links in SD-WAN appliance 80 for all queues in order to get metrics for each of the WAN links for all probe packet sizes in the reference data store (e.g., reference data store 168 of FIG. 5) (202). At some point thereafter, SD-WAN appliance 80 may receive application traffic that includes a data flow and an application data packet (204). If the application is unknown, PDPS engine 110 may forward the application traffic on a default link to the hub device (206). Otherwise, if the application is recognized, the routing techniques described herein may be triggered and PDPS engine may continue to analyze the application data packet and each of the WAN links (208).

Based on the metrics determined by the active probes in step 202, PDPS engine 110 may forward the application traffic to the hub via the WAN link best suited to handle the application traffic (210). PDPS engine 110 may also continue to monitor the application traffic while transmitting the data flow via the WAN link such that, if the metrics for the application traffic fail to satisfy certain SLA parameters, PDPS engine 110 may re-assign the application traffic to a different WAN link that does satisfy the SLA parameters (212).

Figure 7:
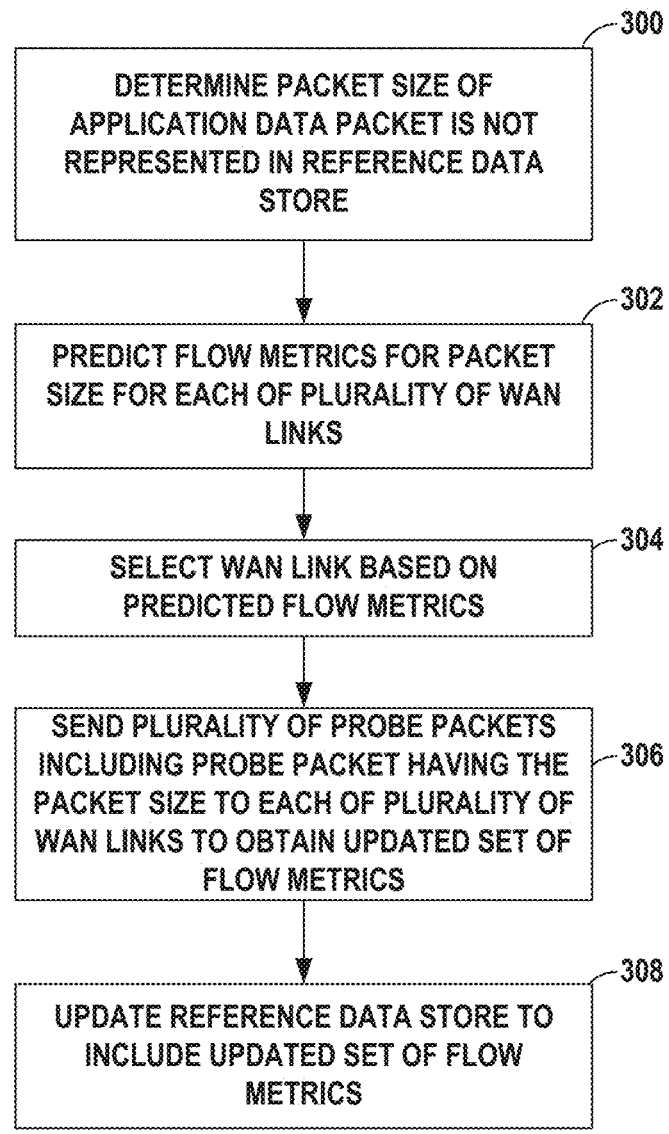
FIG. 7 is a flow diagram illustrating an example technique for software-define wide area network system that performs data monitoring using application quality of experience metric prediction functions, in accordance with the techniques of this disclosure.

FIG. 7 is a flow diagram illustrating an example technique for a software-defined wide area network system that performs data monitoring using application quality of experience metric prediction functions, in accordance with the techniques of this disclosure. The example operation may be performed by PDPS engine 110 executed on SD-WAN appliance 18 from FIG. 1. The following are steps of the process, although other examples of the process performed in the techniques of this disclosure may include additional steps or may not include some of the below-listed steps.

In the example of FIG. 7, PDPS engine 110 may, in response to receiving an application data packet of a data flow, determine whether a packet size of the application data packet is represented in a reference data store (300). The reference data store may include a plurality of probe packet sizes and a corresponding set of one or more metrics for each of a plurality of Wide Area Network (WAN) links. In response to determining that the packet size is not represented in the reference data store, PDPS engine 110 may predict, based on at least a portion of the one or more metrics included in the reference data store, flow metrics for the packet size for each of the plurality of WAN links (302). In some examples, PDPS engine may only perform step 302 and subsequent steps in response to receiving some threshold number of packets having the packet size not represented in the data store, e.g., within a configured time period. In this way, PDPS engine may not predict flow metrics for the new packet size upon receiving just a single packet of the new size, in case that packet size was anomalous, but will do only after receiving a threshold number of packets having the new packet size. PDPS engine 110 may also select, based on the predicted flow metrics, a WAN link of the plurality of WAN links on which to send the application data packet (304). Further, for each of the plurality of WAN links, PDPS engine 110 may send a plurality of probe packets that includes a probe packet having the packet size to the respective WAN link to obtain an updated set of one or more metrics for the respective WAN link that includes metrics for the packet size (306). PDPS engine 110 may also update the reference data store to include the updated set of one or more flow metrics for the each of the plurality of probe packets for the respective WAN link (308).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A method comprising:
   in response to receiving, by a network device, an application data packet of a data flow, determining whether a packet size of the application data packet is represented in a reference data store, wherein the reference data store includes data indicative of a plurality of probe packet sizes and a corresponding set of one or more metrics for each of a plurality of Wide Area Network (WAN) links;
   in response to determining that the packet size is not represented in the reference data store, predicting, by the network device and based on at least a portion of the one or more metrics included in the reference data store, flow metrics for the packet size for each of the plurality of WAN links;
   selecting, by the network device and based on the predicted flow metrics, a WAN link of the plurality of WAN links on which to send the application data packet; and
   for each of the plurality of WAN links:
      sending, by the network device and to the respective WAN link, a plurality of probe packets that includes a probe packet having the packet size to obtain an updated set of one or more metrics for the respective WAN link that includes metrics for the packet size; and
      updating the reference data store to include the updated set of one or more flow metrics for the each of the plurality of probe packets for the respective WAN link.

2. The method of claim 1, further comprising:
   in response to determining that the packet size is represented in the reference data store:

determining, by the network device, a WAN link of the plurality of WAN links on which to send the application data packet of the data flow based on the respective set of one or more metrics for each WAN link of the plurality of WAN links; and sending, by the network device, the application data packet of the data flow to an application server via the WAN link of the plurality of WAN links.

3. The method of claim 2, wherein determining the WAN link comprises:

comparing, by the network device, the respective set of one or more metrics the packet size on each WAN link of the plurality of WAN links to a set of one or more service-level agreement parameters; and selecting, by the network device, a WAN link from the plurality of WAN links that has respective metrics that most closely matches the set of one or more service-level agreement parameters as the WAN link on which to send the application data packet of the second data flow.

4. The method of claim 1, wherein sending the plurality of probe packets comprises:

sending, by the network device, a probe packet having the packet size to each of the plurality of WAN links to obtain respective metrics for the packet size;

for each of the probe packet sizes in the plurality of probe packet sizes, sending, by the network device, a probe packet having the respective probe packet size to each of the plurality of WAN links to obtain the corresponding set of one or more metrics for the respective WAN link-probe packet size pair, wherein each probe packet size is a unique size and is different than the packet size; and storing, by the network device, each set of one or more metrics and the respective metrics for the packet size in the reference data store as the updated set of one or more metrics.

5. The method of claim 1, further comprising:

while transmitting the data flow, comparing, by the network device, the updated set of one or more metrics for the WAN link to a set of one or more service-level agreement parameters; and in response to determining that the updated set of one or more metrics for the WAN link satisfy the set of one or more service-level agreement parameters, maintaining, by the network device, the data flow on the WAN link.

6. The method of claim 5, wherein the WAN link comprises a first WAN link, the method further comprising:

in response to determining that the updated set of one or more metrics for the first WAN link do not satisfy the set of one or more service-level agreement parameters:

determining, by the network device, a second WAN link of the plurality of WAN links with a respective updated set of one or more metrics that satisfy the set of one or more service-level agreement parameters; and re-assigning, by the network device, the data flow to the second WAN link of the plurality of WAN links.

7. The method of claim 1, further comprising:

determining, by the network device, a burst value for the data flow;

in response to determining that the burst flow is not represented in the reference data store, predicting, by the network device and based on the reference data store, flow metrics the burst flow for each of a plurality of WAN links;

updating, based on the burst flow, a probe packet profile stored by the network device; and obtaining one or more flow metrics for each of the plurality of WAN links based on the updated probe packet profile.

8. The method of claim 1, wherein predicting the flow metrics comprises predicting the flow metrics using a machine learning model using one or more of a logistic regression model, a linear discriminant analysis model, a K-Nearest neighbors model, a classification and regression trees model, a Gaussian naïve Bayes model, and a support vector machines model.

9. The method of claim 1, wherein the flow metrics comprise one or more of jitter, round-trip time, packet drop, and bandwidth.

10. The method of claim 1, further comprising:

removing, by the network device and from the reference data store, a particular probe packet size of the plurality of probe packet sizes if a machine learning model indicates that a likelihood of receiving a future data flow with a packet size equal to the particular probe packet size is below a threshold.

11. The method of claim 1, wherein each WAN link of the plurality of WAN links comprises a plurality of queues, and wherein sending the plurality of probe packets comprises:

for each queue of the plurality of queues in each WAN link of the plurality of WAN links, sending, by the network device and to the respective queue, the plurality of probe packets that includes the probe packet having the packet size to obtain an updated set of one or more metrics for the respective queue that includes metrics for the packet size.

12. The method of claim 1, further comprising updating a probe packet profile stored by the network device, wherein sending the plurality of probe packets comprises sending the plurality of probe packets based on the updated probe packet profile.

13. A network device comprising:

a memory configured to store a reference data store that includes data indicative of a plurality of probe packet sizes and a corresponding set of one or more metrics for each of a plurality of Wide Area Network (WAN) links; and one or more processors in communication with the memory, the one or more processors configured to:

in response to receiving an application data packet of a data flow, determine whether a packet size of the application data packet is represented in the reference data store;

in response to determining that the packet size is not represented in the reference data store, predict, based on at least a portion of the one or more metrics included in the reference data store, flow metrics for the packet size for each of the plurality of WAN links;

select, based on the predicted flow metrics, a WAN link of the plurality of WAN links on which to send the application data packet; and for each of the plurality of WAN links:

send, to the respective WAN link, a plurality of probe packets that includes a probe packet having the packet size to obtain an updated set of one or more metrics for the respective WAN link that includes metrics for the packet size; and update the reference data store to include the updated set of one or more flow metrics for the each of the plurality of probe packets for the respective WAN link.

14. The network device of claim 13, wherein the one or more processors are further configured to:
in response to determining that the packet size is represented in the reference data store:
determine a WAN link of the plurality of WAN links on which to send the application data packet of the data flow based on the respective set of one or more metrics for each WAN link of the plurality of WAN links; and
send the application data packet of the data flow to an application server via the WAN link of the plurality of WAN links,
wherein the one or more processors being configured to determine the WAN link comprises the one or more processors being configured to:
compare the respective set of one or more metrics the packet size on each WAN link of the plurality of WAN links to a set of one or more service-level agreement parameters; and
select a WAN link from the plurality of WAN links that has respective metrics that most closely matches the set of one or more service-level agreement parameters as the WAN link on which to send the application data packet of the second data flow.

15. The network device of claim 13, wherein the one or more processors being configured to send the plurality of probe packets comprises the one or more processors being configured to:
send a probe packet having the packet size to each of the plurality of WAN links to obtain respective metrics for the packet size;
for each of the probe packet sizes in the plurality of probe packet sizes, send a probe packet having the respective probe packet size to each of the plurality of WAN links to obtain the corresponding set of one or more metrics for the respective WAN link-probe packet size pair, wherein each probe packet size is a unique size and is different than the packet size; and
store each set of one or more metrics and the respective metrics for the packet size in the reference data store as the updated set of one or more metrics.

16. The network device of claim 13, wherein the WAN link comprises a first WAN link, wherein the one or more processors are further configured to:
while transmitting the data flow, compare the updated set of one or more metrics for the first WAN link to a set of one or more service-level agreement parameters; and
in response to determining that the updated set of one or more metrics for the first WAN link satisfy the set of one or more service-level agreement parameters, maintain the data flow on the first WAN link; and
in response to determining that the updated set of one or more metrics for the first WAN link do not satisfy the set of one or more service-level agreement parameters:
determine a second WAN link of the plurality of WAN links with a respective updated set of one or more metrics that satisfy the set of one or more service-level agreement parameters; and
re-assign the data flow to the second WAN link of the plurality of WAN links.

17. The network device of claim 13, wherein the device comprises a software-defined networking (SDN) device coupled to the WAN links.

18. A non-transitory computer-readable storage medium storing instructions thereon that when executed cause one or more processors, via execution of a software-defined networking (SDN) device, to:
in response to receiving, by a network device, an application data packet of a data flow, determine whether a packet size of the application data packet is represented in a reference data store, wherein the reference data store includes data indicative of a plurality of probe packet sizes and a corresponding set of one or more metrics for each of a plurality of Wide Area Network (WAN) links;
in response to determining that the packet size is not represented in the reference data store, predict, based on at least a portion of the one or more metrics included in the reference data store, flow metrics for the packet size for each of the plurality of WAN links;
select, based on the predicted flow metrics, a WAN link of the plurality of WAN links on which to send the application data packet; and
for each of the plurality of WAN links:
send, to the respective WAN link, a plurality of probe packets that includes a probe packet having the packet size to the respective WAN link to obtain an updated set of one or more metrics for the respective WAN link that includes metrics for the packet size; and
update the reference data store to include the updated set of one or more flow metrics for the each of the plurality of probe packets for the respective WAN link.

19. The non-transitory computer-readable storage medium of claim 18, wherein the instructions, when executed, further cause the one or more processors to:
in response to determining that the packet size is represented in the reference data store:
determine a WAN link of the plurality of WAN links on which to send the application data packet of the data flow based on the respective set of one or more metrics for each WAN link of the plurality of WAN links; and
send the application data packet of the data flow to an application server via the WAN link of the plurality of WAN links,
wherein the instructions that cause the one or more processors to determine the WAN link comprise instructions that, when executed, cause the one or more processors to:
compare the respective set of one or more metrics the packet size on each WAN link of the plurality of WAN links to a set of one or more service-level agreement parameters; and
select a WAN link from the plurality of WAN links that has respective metrics that most closely matches the set of one or more service-level agreement parameters as the WAN link on which to send the application data packet of the second data flow.

20. The non-transitory computer-readable storage medium of claim 18, wherein the instructions, when executed, further cause the one or more processors to:
while transmitting the data flow, compare the updated set of one or more metrics for the first WAN link to a set of one or more service-level agreement parameters; and
in response to determining that the updated set of one or more metrics for the first WAN link satisfy the set of one or more service-level agreement parameters, maintain the data flow on the first WAN link; and in response to determining that the updated set of one or more metrics for the first WAN link do not satisfy the set of one or more service-level agreement parameters:
  determine a second WAN link of the plurality of WAN links with a respective updated set of one or more metrics that satisfy the set of one or more service-level agreement parameters; and
  re-assign the data flow to the second WAN link of the plurality of WAN links.

* * * * *